United States Patent Office 3,203,916
Patented Aug. 31, 1965

3,203,916
MASTERBATCHES MADE FROM POLYMER SOLUTIONS AND CARBON BLACK PELLETED WITH OLEAGINOUS MATERIALS
Andries Voet, Borger, Tex., assignor to J. M. Huber Corporation, Locust, N.J., a corporation of New Jersey
No Drawing. Filed Jan. 21, 1963, Ser. No. 252,572
27 Claims. (Cl. 260—23.7)

The present invention relates to polymer carbon black solvent masterbatching and more particularly to methods of dispersing carbon black in polymer solvent masterbatches.

The present application is a continuation-in-part of applicant's copending application Serial No. 240,746, filed November 28, 1962, entitled, "Carbon Black Process," now abandoned.

In the formation of synthetic polymers, two systems of polymerization have been developed and are in commerical use. These systems may be described as aqueous emulsion systems and solution systems. The instant invention is concerned solely with the solution systems in which the polymerization occurs in an organic solvent. The solvents in such systems are normally recovered, reclaimed and reused. Among specific polymers made by the solvent polymerization system are ethylene propylene terpolymer, ethylene propylene copolymer, polyisoprene, polybutadiene, polyethylene, polypropylene and butyl rubber. In addition, processes exist in which the following polymers are made by solvent polymerization: polychloroprene, butadiene-styrene copolymer, butadieneacrylonitrile copolymer, polyvinyl acetate, polyacrylonitrile, polyisobutylene, chlorinated butyl rubber and brominated butyl rubber. Other elastomeric, plastomeric, and resinous synthetic polymers formed in organic solvent polymerization systems may be used in the invention.

The conditions of polymerization of the above-noted synthetic polymers as well as the nature of the catalyst and equipment used vary greatly, but it will be noted that in each case the reaction medium is an organic solvent or a combination of such solvents. In some instances, the monomers themselves either with or without additional solvent may serve as the reaction medium. Such systems are fully equivalent to the solvent systems for the purpose of this invention.

The synthetic polymers discussed above are used in conventional compounds in which the carbon black reinforcing pigment is dispersed in the dry polymer by intense working in machines such as rubber mills, Banbury mixers, ribbon blenders and like equipment. The carbon black used in such methods is a conventionally pelletized material with which at best only mediocre dispersions are obtained upon subjecting the polymer carbon black mixture to the action of such equipment for an economically reasonable time. Carbon black in unpelletized fluffy form cannot be used in shipping and in processing without an intolerable problem in handling, dusting, and in costly requirements for greater shipping and storage space due to low bulk densities. From experimental laboratory testing reported in I & EC Product Research and Development, volume 1, page 195, September 1962, it has been shown that unpelletized, fluffy carbon black, which is easily dispersed in the polymer by dry mixing, produces a material with significantly superior properties, such as higher modulus, higher tear strength and higher resistance to abrasion. Since fluffy black is impractical for reasons given above, considerable effort has been expended trying to disperse pelletized carbon black in a different manner than in the conventional mixing process to achieve the improved properties.

In a process known as masterbatching, extensively used in polymers produced by emulsion polymerization, the carbon black pellets are first dispersed in water by means of powerful dispersers and the dispersion is thereafter mixed with the polymer latex. Upon coagulation, an intimate mixture of carbon black and polymer is formed with properties superior to a mechanical mixture obtained in conventional mixing equipment.

Unfortunately, however, conventional carbon black pellets strongly resist dispersion in organic solvents. Therefore, the masterbatch approach to a better dispersion of conventionally pelletized carbon black in polymeric systems has not found commercial application in solvent polymerization.

The primary object of the present invention is to produce a masterbatch of carbon black in a polymer in solution in an organic solvent system by dispersing carbon black pellets in the solution of the polymer.

Another object of the invention is to produce a masterbatch with greatly improved properties by dispersing carbon black pellets in a solution of a polymer in an organic solvent system.

The above objects can be attained by using specially prepared carbon black pellets. While the mechanism of pelletization of carbon black in the conventional pelletizing processes is not precisely known, there is evidence that it must be largely understood in terms of chemical binding of carbon particles by a free radical mechanism, as explained in "Industrial and Engineering Chemistry," Product Research and Development Quarterly, volume 1, page 195, of September 1962. These chemical bonds effectively resist complete dispersion.

In the pellets used in the practice of this invention, the smallest particles functioning as kinetic units in the fluffy furnace carbon black are coated with an oleaginous material. This can be clearly observed in electron micrography of such particles. Such oleaginous or oil-like materials are nonvolatile organic chemicals, liquid at the temperature of application. These materials are all characterized by their ability to be adsorbed by the carbon black particles and to form a closely adhering low-volatile film, which envelops the kinetic particle units of the black. Since carbon black is generally hydrophobic and oleophilic, the oleaginous organic liquids described are readily adsorbed and spread out over the carbon black particles to form the desired oleaginous film. Pelletizing proceeds thereafter by a process believed to differ fundamentally from chemical bonding, since the adhesiveness of the oleaginous materials was observed to be a prime causative agent of the formation of pellets. The differentiation between the two processes is apparent from the difference in behavior in the dry process of pelletization in the presence or absence of oleaginous materials. In the presence of such matter, the process proceeds much more rapidly initially and slower thereafter, while the pellets obtained are different in quality. They are less dense and less dusty. Their most important characteristic, however, is that they readily disintegrate and form an excellent dispersion of finely divided carbon black particles in any liquid which is a solvent for the particular oleaginous material selected. This may be readily understood since the bonding material between particles is eliminated. For this reason, we shall refer to such pellets as solvent dispersible pelletized carbon black, or SDP carbon black.

Basically, there are several different ways in which such SDP pellets can be made. In one method, as taught in my Patent No. 2,960,413, the carbon black, in its fluffy form, is mixed with the oleaginous material by adding the latter to the black in a spray or in a suitable mixer followed by thorough mechanical homogenization by means of a micronizer or similar equipment. Thereafter, the mixture is pelletized in a conventional dry pelletizer. The addition of the oleaginous material may be carried out at room temperature or at elevated temperatures.

Equally effective SDP carbon black pellets can be made in the wet process of pelletization. To this purpose, the oleaginous material is emulsified in water. After the unpelletized black has been water-wetted in the pin mixer of the wet pelletizing equipment, the emulsion of the oleaginous material is added, followed by the conventional wet pelletizing and drying. In cases where the oleaginous material is of an acidic nature and produces a water-soluble ammonium salt by neutralization with ammonia, a solution of the ammonium salt could be advantageously used instead of an emulsion. After drying, the decomposition of the ammonium salt restores the oleaginous acidic material on the surface of the smallest kinetic units of the carbon black. While the types of carbon black which can be used consist of the entire group of carbon blacks, especially superior are the furnace and thermal blacks. Thus, SAF, ISAF, HAF, FEF, SRF, FT, etc. can be used with great advantage in the above processes. Treated channel blacks disperse markedly superior in organic solvents than untreated channel blacks. Generally, all types of finely divided carbon or carbonaceous materials which can be formed into pellets in a pelletizing process may be used in the practice of this invention, since in this invention such materials are merely pelletized after the particles have been coated with oleaginous materials, followed by dispersion in a suitable organic solvent.

The quantity of oleaginous material used varies with the requirements. Thus, in certain solvents with good dispersibility characteristics for carbon blacks such as chlorinated hydrocarbons, quantities as low as 1% of the oleaginous materials used in the pelletization of the carbon black lead to a marked improvement in black dispersibility. In other vehicles such as aliphatic hydrocarbon solvents, more oleaginous material is required in the carbon black pellets to obtain a satisfactory effect. Generally between 1–15% by weight of the oleaginous material may be required in the pellets for satisfactory dispersing qualities. Excess of agent above the required amount does not improve the dispersing qualities and in some cases could be harmful by introducing unnecessary quantities of nonpolymeric material into the polymer.

Examples of oleaginous materials of this invention are high boiling petroleum oils and selected fractions of such petroleum oils. Particularly useful are the paraffinic, cycloparaffinic and aromatic oils obtained from high boiling petroleum fractions by selective solvent extraction and known as rubber processing oils. Other materials are still residues from petroleum refining, particularly asphaltic petroleum residues. Liquid polymers such as, for instance, polybutene oils are quite suitable oleaginous materials. Often, solutions of resinous and asphaltic materials in mineral oils act as potent oleaginous materials in the formation of SDP carbon blacks. For instance, solutions of rosin in mineral oils, solutions of gilsonite in mineral oil and similar materials are quite satisfactory. Other suitable materials are fatty animal or vegetable oils. Oleic acid and other fatty acids, such as lauric acid, stearic acid, etc. are satisfactory. While many of these acids are solids at room temperature, they act as oleaginous materials at an elevated temperature above their melting point. Higher temperatures, even up to 300° C. may be used in adding the oleaginous matter to the carbon blacks. Thus, the use of pitches and similar materials not fluid at room temperature is possible. For instance, stearic pitch and tall oil pitch, both still residues respectively from the manufacture of stearic acid and tall oil, are suitable oleaginous materials.

In the manufacture of synthetic polymers in the process of solvent polymerization, the polymer is formed during this process and obtained in solution in the solvent. Generally, the polymer is recovered by simple removal of the solvent which may be done by ordinary distillation and distillation under reduced pressure. Another very successful method of removing the solvent from the polymer is by means of steam distillation.

The polymer may also be isolated by adding to the solvent a liquid miscible with the solvent but in which the polymer is insoluble. Consequently, the polymer is practically insoluble in the mixture of the solvent and the added liquid, and thus precipitates. These liquids are often known as antisolvents. Solvents used are generally aliphatic or aromatic hydrocarbons or chlorinated hydrocarbons. As antisolvents, alcohols and ketones are often used.

In the practice of this invention, the SDP black is dispersed in the solvent in those processes involving distillation and in the other processes, it may be dispersed either in the solvent or in the antisolvent. If a dispersion is readily formed in the antisolvent, an intimate mixture with the synthetic polymer is obtained, equally finely divided as when the SDP black is dispersed in the solvent. It is obvious from the foregoing that SDP blacks dispersible in the antisolvent must be made with oleaginous materials which are soluble in the antisolvent, just as SDP blacks which are dispersible in the solvent must be made with oleaginous materials soluble in the solvent. The expression "soluble" is to be understood to be applicable in its widest significance and to include spontaneous colloidal dispersion of the oleaginous material into the solvent or the antisolvent.

While the oleaginous material has its most important function as binder in the SDP pellet, it may be selected to have a function as plasticizer or extender in the polymer. When using distillation processes for separating the solvent and polymer, the oleaginous material is selected to be compatible with the polymer since it will remain in the polymer as the solvent is removed. If the oleaginous material is compatible with the polymer and insoluble in the mixture of solvent and antisolvent, it will be taken up in the polymer, together with the carbon black. When the oleaginous material is soluble in the mixture of solvent and antisolvent and compatible with polymer, it will be divided between the two, dependent upon concentration and solubility conditions. When incompatible with the polymer, the oleaginous material will remain dissolved in the mixture of solvent and antisolvent if soluble therein, or be precipitated if insoluble therein.

Examples of SDP blacks of this invention which are dispersible in hydrocarbon and chlorinated hydrocarbon solvents are found in Examples 1, 2, 3, 4, and 5 of my U.S. Patent No. 2,960,413. While some of these blacks, notably some of the channel blacks did not form satisfactory printing inks, they produce a satisfactory dispersion of channel black in solvents for rubber masterbatching. The method used, dry pelletizing, permits the incorporation of all oleaginous materials of this invention. Thus, aliphatic, cycloparaffinic and aromatic high molecular hydrocarbons, resinous and asphaltic materials, fatty oils and acids, pitches, etc., are advantageously added to the fluffy blacks in the desired quantities at the preferred temperatures, followed by dry pelletization. Other methods of preparation indicated previously will prdouce SDP black fully equivalent to the above blacks, of the desired composition and dispersible in the solvent, antisolvent or both, according to the type desired.

In addition to the general methods disclosed above, it should be noted that the SDP carbon black may be dispersed in the same solvent as the solvent in which the polymer is formed; again, it may be dispersed in another organic liquid miscible with this solvent and in which the polymer is soluble. Equally, the SDP carbon black may be dispersed in the same antisolvent used in precipitating the polymer from the solvent; again, it may be dispersed in another organic antisolvent miscible with the antisolvent used in precipitating the polymer.

The masterbatches obtained when the solvent is removed by ordinary distillation at reduced pressure or by steam distillation have excellent characteristics. These methods of recovery permit the addition of nonvolatile additives such as processing oils and other nonvolatile chemicals into the solution. The removal of the solvent by distillation in any form will permit the homogeneous distribution of all nonvolatile additives which are soluble in the solvent, throughout the carbon black polymer masterbatch.

The following examples are indicative as to the use of the SDP blacks in a number of polymers produced by solvent polymerization. They are in no way restrictive, but merely illustrative of the characteristic procedures used in the practice of this invention and given here in order that persons skilled in the art may more fully appreciate my invention and the methods by means of which it may be practiced.

*Example 1*

In a polymerization reaction of butadiene in toluene, 1000 grams of a solution of a polymer (predominantly cis-polybutadiene) was obtained in a concentration of about 15% by weight in toluene. To this solution was added 83 grams of a pelletized, solvent dispersible HAF furnace black containing 10% of an aromatic rubber processing oil obtained by solvent extraction of petroleum hydrocarbons and marketed as Dutrex 739. The mixture was agitated for 15 minutes by means of a high speed stirrer. Thereupon, the solvent was removed by steam distillation of the mixture. The crumbs obtained were washed and dried. A polybutadiene-carbon black masterbatch evidenced superior modulus, tensile, tear and abrasion characteristics in a conventional rubber compound when compared with an identical mixture produced by dry mixing of the ingredients with the rubber on a rubber mill.

*Example 2*

In a polymerization reaction of isoprene in benzene, 1000 grams of a solution of a polyisoprene were obtained in a concentration of about 20% by weight in benzene. To 1000 grams of benzene were added 110 grams of a pelletized, solvent dispersible ISAF type furnace black containing 8% of tall oil pitch. The mixture was agitated for 15 minutes with the aid of a high speed mixer. The dispersion formed was added to the concentration of the polymer in benzene and the mixture was agitated for 5 minutes. The solvent was then removed by distillation, followed by washing and drying of the crumbs. A polyisoprene-carbon black masterbatch was formed with superior modulus, abrasion, tensile and tear characteristics in a conventional rubber compound as compared to the same compound formed by dry mixing of the ingredients.

*Example 3*

In a copolymerization reaction of butdiene and styrene in methyl chloride as a solvent, 1000 grams of a solution was obtained containing 10% by weight of the copolymer of butadiene and styrene in methyl chloride. To this solution was added 50 grams of a pelletized, solvent dispersible HAF furnace carbon black containing 7% of a cycloparaffinic processing oil obtained from petroleum hydrocarbons by extraction. The mixture was agitated with a high speed stirrer for 10 minutes, after which a homogeneous dispersion of the carbon black in the rubber was obtained. The masterbatch was recovered by evaporation of the solvent under reduced pressure followed by washing and drying of the crumb.

The resulting product had superior modulus, tensile, abrasion and tear properties in a conventional rubber compound when compared with the identical compound obtained by dry mixing of the ingredients on a conventional rubber mill.

*Example 4*

Propylene at the rate of 3 liters per minute and ethylene at 1 liter per minute were passed into 2 liters of tetrachloroethylene to which had been added 2.6 grams of 3-ethyl-2,12-tridecadiene. After 5 minutes, 1.04 grams of vanadyl trichloride, 2.0 grams of triisobutyl aluminum and 2.7 grams of aluminum chloride were added. A solution of 7.8 grams of 11-ethyl-1,11-tridecadiene in 45 milliliters of tetrachloroethylene was added to the reaction over a period of 45 minutes. The polymerization was continued for 5 minutes more with the gases introduced at the stated rates. Thereafter, 24 grams of SDP furnace HAF carbon black containing 5% of an asphaltic petroleum still residue was added, followed by 5 minutes of agitation. The product, ethylene-propylene terpolymer, was then isolated by pouring the mixture into methanol containing hydrogen chloride. The elastomeric precipitate was dried by milling on a rubber mill. A total yield of 60 grams of a masterbatch was obtained. The masterbatch showed considerable improvement in modulus, abrasion and tear characteristics when compared with an identical compound made by dry mixing of the components with the polymer.

*Example 5*

The same elastomer was made as in Example 4. SDP furnace HAF carbon black (24 grams) of Example 4 was separately dispersed into 250 grams of tetrachloroethylene by agitation for 5 minutes by means of a high speed agitator. The dispersion was then added to the solution of the elastomer. The masterbatch obtained was identical to that of Example 4. Again, the masterbatch had markedly improved modulus, tear and abrasion characteristics over an identical compound made by dry mixing of the black into the polymer.

*Example 6*

The same elastomer was made as in Example 4. The solution of the elastomer was poured into acetone in which hydrochloric acid was dissolved and in which 24 grams of SDP furnace ISAF carbon black containing 3% oleic acid was previously dispersed by agitation for 15 minutes with a high speed stirrer. The resultant masterbatch was quite similar to the masterbatches of Examples 4 and 5, with improved properties of modulus, abrasion and tear as compared with a dry mixture of the components with the polymer.

*Example 7*

A glass-lined, 2-liter autoclave equipped with a reflux condenser and a high speed agitator was first purged with dry nitrogen gas and thereafter charged with 1.1 liter purified dry cyclohexane and 2.14 grams of tetraphenyl tin. The liquid was heated to 70° C. The nitrogen stream was then replaced by an ethylene-propylene mixture containing 14 mol percent of propylene and the autoclave was pressurized to 30 pounds per square inch. A catalyst consisting of 5 milligrams of vanadium tetrachloride and 2.67 grams of aluminum bromide dissolved in 10 milliliters of dry cyclohexane was injected into the reaction mixture through a rubber puncture disc. The reaction started and was allowed to proceed for 45 minutes. After release of the pressure, 5 grams of SDP furnace FEF carbon black containing 7½% of an asphaltic petroleum residue oil was introduced into the solvent, followed by 5 minutes of agitation. Thereupon, 2 liters of methanol containing 5 milliliters of concentrated hydrochloric acid was added. The precipitated masterbatch of carbon black and ethylene propylene rubber (EPR) was then washed and dried. It showed markedly improved modulus, tear and abrasion characteristics over a similar compound made by dry mixing the ingredients with the rubber.

Example 8

440 parts of benzene was charged to a thick-walled bottle, after which 5.5 parts of titanium tetraiodide was charged to the bottle. Thereafter, 0.38 part of lithium aluminum hydride was charged as a 1.14 molar solution in diethyl ether. Thereupon, 100 parts of isoprene was charged. During the charging of the catalyst components and the isoprene, the vapor space in the bottle was continuously flushed with nitrogen. After these materials were charged, the bottle was sealed with a neoprene seal and a crown bottle cap which was punched so as to expose a portion of the neoprene seal. The bottle was then placed in a constant temperature bath and shaken for 24 hours at 30° C. At the end of this time, the bottle was removed. Thereupon, 35 parts of SDP furnace ISAF black containing 6% by weight of an aromatic oil derived from petroleum refining by solvent extraction was dispersed into 200 parts of benzene by agitating for 15 minutes by means of a high speed stirrer. The dispersion was thereupon added to the bottle and thoroughly blended with the polymer solution. The contents of the bottle was then discharged into 1 liter of isopropanol. The resulting mixture was stirred vigorously. The precipitated masterbatch of polymer and black was removed and dried in vacuum. The polyisoprene rubber-carbon black masterbatch had markedly superior modulus, tear and abrasion characteristics when compared with an identical mixture produced by dry mixing of the ingredients with the rubber.

Example 9

The same elastomer was made as in Example 4. The solution of the elastomer was poured into acetone in which 35 parts of SDP furnace ISAF carbon black containing 3% tall oil pitch was dispersed previously by agitation for 15 minutes with a high speed stirrer. The resultant masterbatch was quite similar to the masterbatch of Example 4 and had superior properties to an identical mixture made by dry mixing of the ingredients with the elastomer.

Example 10

A glass flask was charged with 5 grams of anhydrous cobaltous chloride and 300 cubic centimeters of dry butadiene and sealed. After standing for several hours at 25° C., a polymer was formed which was then dissolved in benzene by agitation. The solution was filtered. Thereupon, 100 grams of SDP furnace SAF carbon black containing 7.5% of a cycloparaffinic oil derived from petroleum refining by solvent extraction was dispersed into the polymer solution by agitation for 15 minutes by means of a high shear stirrer. Thereupon, 100 milliliters of methanol was added precipitating a solid masterbatch of the carbon black and the predominantly cis-1,4-polybutadiene rubber. The modulus, tear and abrasion properties of this masterbatch were quite superior to the properties of a similarly constituted mixture made by mixing of the ingredients with the polymer in a Banbury mixer.

Example 11

The same polymer was made as in Example 4. Separately, 100 grams of SDP ISAF furnace carbon black containing 7½% of an aromatic oil was dispersed in 400 grams of benzene by means of a high speed stirrer. The filtered benzene solution of the polymer was mixed with the benzene dispersion of SDP black. Methanol was then added and a masterbatch of the polybutadiene rubber with carbon black was formed, washed and dried. Its properties were superior to those of a similarly constituted mixture made by dry mixing the ingredients with the polymer.

Example 12

A mixture of 99 parts by volume of liquid isobutylene, 1 part of piperylene and 4 parts of liquid ethylene was introduced into a reactor vessel and cooled by means of refrigerants to −80° C. A solution of 0.5% of aluminum chloride in methyl chloride was first cooled to about −80° C. and then sprayed the surface of the vigorously agitated mixture of olefins. The polymerization proceeded rapidly and was approximately 80% complete in 5 minutes. A previously prepared dispersion in methyl chloride of 30 grams of SDP furnace ISAF carbon black containing 5% of an aromatic oil, obtained by solvent extraction from petroleum hydrocarbons, made by vigorous agitation with a high speed agitator for 5 minutes, was then mixed with the polymer solution. Immediately thereafter, the mixture was precipitated with isopropanol. The butyl rubber masterbatch was then brought up to room temperature, washed and dried.

The same rubber was produced in the identical manner without carbon black. A mixture was then made up of the following composition:

| | Parts |
|---|---|
| Butyl rubber | 100 |
| SAF carbon black | 50 |
| Processing oil * | 5 |
| Stearic acid | 1 |
| Zinc oxide | 5 |
| Promotor ** | 0.25 |
| Benzothiazyl disulfide | 1 |
| Tetramethyl thiuram disulfide | 1 |
| Sulfur | 1 |

*Necton 60.
**Elastopar.

It was mixed in a standard mixing process.

At the same time, 150 parts of the butyl masterbatch of this example, consisting of 100 parts of butyl rubber and 50 parts of SAF carbon black, was processed by mixing the same ingredients except the carbon black into the masterbatch in the same manner as the constituents of the dry mix were added to the butyl rubber and carbon black.

The resultant rubber compositions were tested. The following table is a comparison of the modulus qualities.

| | Modulus, p.s.i. | | | |
|---|---|---|---|---|
| | 300% Elongation | 400% Elongation | 500% Elongation | 600% Elongation |
| Conventional Mixture | 720 | 1,210 | 1,650 | 2,300 |
| Masterbatch Mixture | 950 | 1,490 | 1,910 | 2,510 |

Equally, with a resistance to abrasion of the conventional mixture arbitrarily set at 100 in terms of reciprocal weight losses, the resistance to abrasion of the masterbatch is 122 and, therefore, markedly superior.

Example 13

A quantity of 2.5 grams of diethyl aluminum chloride was dissolved in 200 milliliters of dry n-heptane. A quantity of 2.0 milliliters of titanium tetrachloride was dissolved in 125 milliliters of dry n-heptane. A dispersion was made in 200 milliliters of dry n-heptane of 25 grams of SDP furnace black of the channel type containing 3% of a white mineral oil by agitation for 15 minutes by means of a high speed stirrer at 50° C. The catalyst solutions were added to the carbon black slurry. After 15 minutes at 50° C., 1.5 liters of dry heptane was added and gaseous ethylene passed into the mixture at atmospheric pressure and at 50° C. for a period of 5 hours. During the run an additional 1.5 liters of dry heptane was added to reduce the viscosity of the mixture and 2 grams of aluminum triethyl to increase the catalyst activity. Thereafter 500 cubic centimeters of isopropanol was added and the masterbatch of polyethylene and carbon black were separated, washed and dried. The black was extremely well dispersed into the polyethylene, considerably better than could be achieved by dry mixing of the same black into the same polyethylene, as shown by microscopic examination.

While the previous examples all refer to polymers formed in organic solvent systems, the principles of this invention are equally applicable to all polymers which can be dissolved in organic solvents. The prepared solution of the polymer in solvent is then fully equivalent to the solution of a polymer formed from a monomer in the solvent.

The following examples illustrate the use of prepared polymer organic solvent solutions in practicing the invention.

*Example 14*

50 grams of smoked sheet (natural rubber) were sheeted on a roller mill and dissolved in 1000 grams of toluene by submerging the rubber in the solvent for 24 hours while occasionally agitating the mixture. 25 grams of SDP carbon black containing 6% of tall oil pitch was dispersed in 250 grams of toluene by agitating for 5 minutes with a high speed mixer. The carbon black-toluene dispersion was added to the rubber solution and mixed for 2 minutes. 1500 grams of acetone was then added to the carbon black-rubber mixture, precipitating a masterbatch of carbon black and rubber which was recovered, freed from solvent on a rubber mill, and dried. The rubber products produced from this masterbatch evidenced marked improvement in modulus, resistance to abrasion and tear properties when compared to rubber products compounded by conventional methods.

*Example 15*

Example 14 was repeated except the SDP carbon black was dispersed in 250 grams of methyl chloride instead of toluene. The materbatch recovered was made into rubber products which gave the same superior properties as the products of Example 14.

*Example 16*

50 grams of SBR (butadiene-styrene copolymer) rubber was dissolved in 1000 grams of methyl chloride. 25 grams of SDP carbon black containing 6% of stearic pitch was dispersed in 250 grams of acetone by agitation for 5 minutes at 50° C. The dispersion was then added to the SBR solution under agitation, following which 1250 grams of methanol was added. An SBR carbon black masterbatch precipitated and was then freed of solvent on a rubber mill and dried. Marked improvement in properties was noted for this product when compared to conventionally compounded products.

*Example 17*

Example 16 was repeated with the exception that the masterbatch was finally precipitated with 1250 grams of acetone. The masterbatch was recovered as before and was found to have the same improved properties as the masterbatch resulting from Example 16.

The term "polymer" as used in the specification and claims includes polymers, interpolymers, copolymers and terpolymers.

The pelletized carbon black used in the above examples disperses completely in a very short time in processes carried on at ambient temperatures. Elevated temperatures such as 50° C. to 60° C. in the case of a toluene solvent will, with more vigorous agitation, cause the dispersion to occur even more quickly.

Having thus described the preferred embodiments of this invention, it should be understood that other modifications and adaptations may be restorted to without departing from the scope of the appended claims.

I claim:

1. A process of producing polymer-carbon black masterbatches comprising forming a polymer in an organic solvent, introducing a carbon black pelletized with an oleaginous material in a liquid state, agitating the carbon black pellets in the solvent, disintegrating the carbon black pellets by dissolving the oleaginous material in the organic solvent, dispersing the carbon black throughout the polymer and recovering a polymer-carbon black masterbatch.

2. A process of producing polymer-carbon black masterbatches comprising forming a polymer in an organic solvent, introducing a carbon black pelletized with an asphaltic petroleum still residue in a liquid state, agitating the carbon black pellets in the solvent, disintegrating the carbon black pellets by dissolving the asphaltic petroleum still residue in the organic solvent, dispersing the carbon black throughout the polymer and recovering a polymer-carbon black masterbatch.

3. A process of producing polymer-carbon black masterbatches comprising forming a polymer in an organic solvent, introducing a carbon black pelletized with a cycloparaffinic oil derived from petroleum refining by solvent extraction in a liquid state, agitating the carbon black pellets in the solvent, disintegrating the carbon black pellets by dissolving the cycloparaffinic oil in the organic solvent, dispersing the carbon black throughout the polymer and recovering a polymer-carbon black masterbatch.

4. A process of producing polymer-carbon black masterbatches comprising forming a polymer in an organic solvent, introducing a carbon black pelletized with aromatic oil derived from solvent extraction from petroleum hydrocarbons in a liquid state, agitating the carbon black pellets in the solvent, disintegrating the carbon black pellets by dissolving the aromatic oil in the organic solvent, dispersing the carbon black throughout the polymer and recovering a polymer-carbon black masterbatch.

5. A process of producing polymer-carbon black masterbatches comprising forming a polymer in an organic solvent, introducing a carbon black pelletized with an oleaginous material in a liquid state, agitating the carbon black pellets in the solvent, disintegrating the carbon black pellets by dissolving the oleaginous material in the organic solvent, dispersing the carbon black throughout the polymer, introducing an antisolvent in a quantity sufficient to precipitate the polymer from the solvent.

6. A process of producing polymer-carbon black masterbatches comprising forming a polymer in an organic solvent, introducing a carbon black pelletized with lauric acid in a liquid state, agitating the carbon black pellets in the solvent, disintegrating the carbon black pellets by dissolving the lauric acid in the organic solvent, dispersing the carbon black throughout the polymer and recovering a polymer-carbon black masterbatch.

7. A process of producing polymer-carbon black masterbatches comprising forming a polymer in an organic solvent, introducing a carbon black pelletized with stearic acid in a liquid state, agitating the carbon black pellets in the solvent, disintegrating the carbon black pellets by dissolving the stearic acid in the organic solvent, dispersing the carbon black throughout the polymer and recovering a polymer-carbon black masterbatch.

8. A process of producing polymer-carbon black masterbatches comprising forming a polymer in an organic solvent, introducing a carbon black pelletized with stearic pitch in a liquid state, agitating the carbon black pellets in the solvent, disintegrating the carbon black pellets by dissolving the stearic pitch in the organic solvent, dispersing the carbon black throughout the polymer and recovering a polymer-carbon black masterbatch.

9. A process of producing polymer-carbon black masterbatches comprising forming a polymer in an organic solvent, introducing a carbon black pelletized with tall oil pitch in a liquid state, agitating the carbon black pellets in the solvent, disintegrating the carbon black pellets by dissolving the tall oil pitch in the organic solvent, dispersing the carbon black throughout the polymer and recovering a polymer-carbon black masterbatch.

10. A process as claimed in claim 1 wherein the oleaginous material consists essentially of a solution of rosin in mineral oil.

11. A process as claimed in claim 1 wherein the oleaginous material consists essentially of a solution of gilsonite in mineral oil.

12. A process as claimed in claim 1 wherein the oleaginous material consists essentially of a liquid polymer.

13. A process of producing polymer-carbon black masterbatches comprising forming a polymer in an organic solvent, introducing a carbon black pelletized with an oleaginous material in a liquid state, agitating the carbon black pellets in the solvent, disintegrating the carbon black pellets by dissolving the oleaginous material in the organic solvent, dispersing the carbon black throughout the polymer and recovering a polymer-carbon black masterbatch by distillation of the solvent from the solvent-polymer solution.

14. A process of producing polymer-carbon black masterbatches comprising forming a polymer in an organic solvent, introducing a carbon black pelletized with an asphaltic petroleum still residue in a liquid state, agitating the carbon black pellets in the solvent, disintegrating the carbon black pellets by dissolving the asphaltic petroleum still residue in the organic solvent, dispersing the carbon black throughout the polymer and recovering a polymer-carbon black masterbatch by distillation of the solvent from the solvent-polymer solution.

15. A process of producing polymer-carbon black masterbatches comprising forming a polymer in an organic solvent, introducing a carbon black pelletized with a cycloparaffinic oil derived from petroleum refining by solvent extraction in a liquid state, agitating the carbon black pellets in the solvent, disintegrating the carbon black pellets by dissolving the cycloparaffinic oil in the organic solvent, dispersing the carbon black throughout the polymer and recovering a polymer-carbon black masterbatch by distillation of the solvent from the solvent-polymer solution.

16. A process of producing polymer-carbon black masterbatches comprising forming a polymer in an organic solvent, introducing a carbon black pelletized with aromatic oil derived from solvent extraction from petroleum hydrocarbons in a liquid state, agitating the carbon black pellets in the solvent, disintegrating the carbon black pellets by dissolving the aromatic oil in the organic solvent, dispersing the carbon black throughout the polymer and recovering a polymer-carbon black masterbatch by distillation of the solvent from the solvent-polymer solution.

17. A process of producing polymer-carbon black masterbatches comprising dissolving a polymer in an organic solvent, introducing a carbon black pelletized with an oleaginous material in a liquid state, agitating the carbon black pellets in the solvent, disintegrating the carbon black pellets by dissolving the oleaginous material in the organic solvent, dispersing the carbon black throughout the polymer, introducing an antisolvent in a quantity sufficient to precipitate the polymer from the solvent and recovering a polymer-carbon black masterbatch.

18. A process of producing polymer-carbon black masterbatches comprising forming a polymer in an organic solvent, introducing a carbon black pelletized with lauric acid in a liquid state, agitating the carbon black pellets in the solvent, disintegrating the carbon black pellets by dissolving the lauric acid in the organic solvent, dispersing the carbon black throughout the polymer and recovering a polymer-carbon black masterbatch by distillation of the solvent from the solvent-polymer solution.

19. A process of producing polymer-carbon black masterbatches comprising forming a polymer in an organic solvent, introducing a carbon black pelletized with stearic acid in a liquid state, agitating the carbon black pellets in the solvent, disintegrating the carbon black pellets by dissolving the stearic acid in the organic solvent, dispersing the carbon black throughout the polymer and recovering a polymer-carbon black masterbatch by distillation of the solvent from the solvent-polymer solution.

20. A process of producing polymer-carbon black masterbatches comprising forming a polymer in an organic solvent, introducing a carbon black pelletized with stearic pitch in a liquid state, agitating the carbon black pellets in the solvent, disintegrating the carbon black pellets by dissolving the stearic pitch in the organic solvent, dispersing the carbon black throughout the polymer and recovering a polymer-carbon black masterbatch by distillation of the solvent from the solvent-polymer solution.

21. A process of producing polymer-carbon black masterbatches comprising forming a polymer in an organic solvent, introducing a carbon black pelletized with tall oil pitch in a liquid state, agitating the carbon black pellets in the solvent, disintegrating the carbon black pellets by dissolving the tall oil pitch in the organic solvent, dispersing the carbon black throughout the polymer and recovering a polymer-carbon black masterbatch by distillation of the solvent from the solvent-polymer solution.

22. A process of producing polymer-carbon black masterbatches comprising forming a polymer in an organic solvent, dispersing in an antisolvent a carbon black pelletized with an oleaginous material in a liquid state soluble in the antisolvent, agitating the carbon black pellets in the antisolvent, disintegrating the carbon black pellets by dissolving the oleaginous material in the antisolvent, adding the carbon black antisolvent dispersion to the organic solvent polymer solution to precipitate the polymer from the solvent, and recovering a polymer-carbon black masterbatch.

23. A process of producing polymer-carbon black masterbatches comprising forming a polymer in an organic solvent, dispersing a carbon black pelletized with an oleaginous material in a liquid state in an organic solvent fully miscible with the organic solvent in which the monomer is polymerized and compatible with the polymer, agitating the carbon black pellets in the organic solvent, disintegrating the pellets by dissolving the oleaginous material in the organic solvent in which the carbon black is dispersed, adding the carbon black organic solvent dispersion to the polymer organic solvent solution, and recovering a polymer-carbon black masterbatch.

24. A process of producing polymer-carbon black masterbatches comprising forming a polymer in an organic solvent, dispersing in an antisolvent a carbon black pelletized with an oleaginous material in a liquid state soluble in the antisolvent, agitating the carbon black pellets in the antisolvent, disintegrating the carbon black pellets by dissolving the oleaginous material in the antisolvent, adding the carbon black antisolvent dispersion to the organic solvent, dispersing the carbon black throughout the polymer, adding an antisolvent fully miscible with the first-named antisolvent to the polymer solution in a quantity sufficient to precipitate the polymer from the solvent, and recovering a polymer-carbon black masterbatch.

25. A process of producing polymer-carbon black masterbatches comprising dissolving a polymer in an organic solvent, introducing a carbon black pelletized with an oleaginous material in a liquid state, agitating the carbon black pellets in the solvent, disintegrating the carbon black pellets by dissolving the oleaginous material in the organic solvent, dispersing the carbon black throughout the polymer and recovering a polymer-carbon black masterbatch.

26. A process of producing polymer-carbon black masterbatches comprising dissolving a polymer in an organic solvent, dispersing a carbon black pelletized with an oleaginous material in a liquid state in an organic solvent fully miscible with the organic solvent in which the monomer is polymerized and compatible with the polymer, agitating the carbon black pellets in the organic solvent, disintegrating the pellets by dissolving the oleaginous material in the organic solvent in which the carbon black is dispersed, adding the carbon black organic solvent dispersion to the polymer organic solvent solution, dispersing the carbon black throughout the polymer and recovering a polymer-carbon black masterbatch.

27. A process of producing polymer-carbon black masterbatches comprising dissolving a polymer in an organic solvent, dispersing in an antisolvent a carbon black pelletized with an oleaginous material in a liquid state soluble in the antisolvent, agitating the carbon black pellets in the antisolvent, disintegrating the carbon black pellets by dissolving the oleaginous material in the antisolvent, adding the carbon black antisolvent dispersion to the organic solvent polymer solution to precipitate the polymer from the solvent, and recovering a polymer-carbon black masterbatch.

References Cited by the Examiner
UNITED STATES PATENTS

| | | | |
|---|---|---|---|
| 2,170,439 | 8/39 | Gaylor | 264—184 |
| 2,223,171 | 11/40 | Gaylor | 260—45.7 |
| 2,960,413 | 11/60 | Voet | 106—31 |

LEON J. BERCOVITZ, *Primary Examiner.*

DONALD E. CZAJA, *Examiner.*